(12) United States Patent
Ryan et al.

(10) Patent No.: US 9,191,353 B2
(45) Date of Patent: Nov. 17, 2015

(54) PROVIDING OPEN SESSION BASED SELECTIVE BROADCASTING IN AN INSTANT MESSAGING SYSTEM

(75) Inventors: Corinne M. Ryan, Westford, MA (US); Ruthie D. Lyle, Durham, NC (US); Doris L. Jones, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 1231 days.

(21) Appl. No.: 11/780,753

(22) Filed: Jul. 20, 2007

(65) Prior Publication Data

US 2009/0024932 A1    Jan. 22, 2009

(51) Int. Cl.
G06F 3/00 (2006.01)
H04L 12/58 (2006.01)
H04L 12/18 (2006.01)
G06F 3/01 (2006.01)

(52) U.S. Cl.
CPC ............ H04L 51/28 (2013.01); H04L 12/1818 (2013.01); H04L 51/04 (2013.01); H04L 12/185 (2013.01)

(58) Field of Classification Search
CPC ..... H04L 51/32; H04L 12/1813; H04L 51/04; H04L 51/28; H04L 12/185; H04L 12/1818
USPC .......................................... 715/753, 758, 751
See application file for complete search history.

(56) References Cited

U.S. PATENT DOCUMENTS

| | | | |
|---|---|---|---|
| 6,539,421 B1 | 3/2003 | Appelman et al. | |
| 6,981,223 B2 * | 12/2005 | Becker et al. | 715/753 |
| 7,120,668 B2 * | 10/2006 | Manber et al. | 709/205 |
| 7,224,774 B1 * | 5/2007 | Brown et al. | 379/88.14 |
| 7,571,190 B2 * | 8/2009 | Nguyen et al. | 1/1 |
| 2002/0021307 A1 | 2/2002 | Glenn et al. | |
| 2002/0130904 A1 | 9/2002 | Becker et al. | |
| 2004/0158471 A1 | 8/2004 | Davis | |
| 2006/0232663 A1 | 10/2006 | Gandhi | |

(Continued)

FOREIGN PATENT DOCUMENTS

| | | | |
|---|---|---|---|
| JP | 2006127301 A | 5/2006 |
| KR | 4071981 A | 8/2004 |

(Continued)

OTHER PUBLICATIONS

Jania, "Broadcast Messaging: Messaging to the Masses", ACM QUEUE, Nov. 2003, pp. 38-43.

(Continued)

*Primary Examiner* — Nicholas Augustine
(74) *Attorney, Agent, or Firm* — BainwoodHuang

(57) ABSTRACT

A system for providing open session based selective broadcasting in an instant messaging system. The instant messaging system user is provided with a mechanism through which they can broadcast a user-defined message to the participants in all currently open instant messaging sessions with the user, or to the participants in a selected subset of currently open instant messaging sessions with the user. The system provides the ability to capture and save a list of the participants receiving a previously broadcast message. The captured participant list can be subsequently recalled and used to broadcast another user defined message when the interruption ends, and the user can resume participation in the sessions.

9 Claims, 6 Drawing Sheets

(56) References Cited

U.S. PATENT DOCUMENTS

2006/0242232 A1* 10/2006 Murillo et al. .............. 709/204
2006/0265454 A1 11/2006 Forlenza et al.

FOREIGN PATENT DOCUMENTS

WO WO2004/027636 A1 4/2004
WO WO2004/092901 A2 10/2004

OTHER PUBLICATIONS

"Software Solutions: The AristoClass Interactive Learning Experience; AristoClass The ultimate software solution for an interactive learning experience", Jul. 2007, http://www.minicom.com/cbt_aristaclass.htm, pp. 1-3.

* cited by examiner

PROVIDING OPEN SESSION BASED SELECTIVE BROADCASTING IN AN INSTANT MESSAGING SYSTEM

FIELD OF THE INVENTION

The present invention relates generally to instant messaging systems, and more specifically to a method and system for providing open session based selective broadcasting in an instant messaging system.

BACKGROUND OF THE INVENTION

As it is generally known, in computer-based communications, instant messaging systems enable instant communications between two or more people over a communication network such as the Internet. Instant messaging typically requires the use of a client program or logic to provide an instant messaging service. Instant messaging differs from electronic mail ("email") in that conversations happen in real-time. Instant messaging sessions are sometimes referred to as "chat" sessions. Distribution of on-line "presence" information describing current user states, e.g. whether users are currently on-line and available to participate in an instant messaging session, is a key aspect of existing instant messaging systems. The combination of current user state distribution and the capability to hold real-time, on-line conversations continues to make instant messaging a very useful tool for vital business communications. Examples of existing instant messaging technologies include Qnext, MSN Messenger, AOL Instant Messenger, Yahoo! Messenger, Skype, Google Talk, .NET Messenger Service, Jabber, QQ, iChat and ICQ, and Internet Relay Chat (IRC).

With the increased use of instant messaging, a problem arises when users find themselves multitasking between multiple instant messaging sessions, and are then interrupted by an external event that must be dealt with, such as a phone ringing, a manager stopping in their office, etc. In such a situation, the user needs to be able to quickly and efficiently inform all of the other users they are currently instant messaging with in the multiple instant messaging session that they are being temporarily interrupted. Similarly, the user needs to be able to inform all of those other users when the interruption is over, and they can resume the instant messaging sessions (e.g. the phone call is over, the manager leaves their office, etc.).

This problem has not previously been recognized, and existing system design accordingly does not address it. In existing systems, in order for a user to communicate a message to all participants in all current instant messaging sessions in which they are participating, the user must either type or otherwise enter a separate message into each of the individual sessions (e.g. type "be right back—phone rang!" into the text entry field for each session), or copy and paste such a message into each of the session text entry fields. These operations are time consuming and inconvenient, and as a result users typically just tend to the interruption without informing the other session participants, potentially resulting in confusion or misunderstanding as to why their responses may be delayed during the interruption.

Some existing systems allow users to broadcast a message to a separately defined user community, or to all users logged-in at the time the broadcast is sent. Such approaches are not useful with regard to solving the above described problem, since the messages conveyed through them are delivered to a set of recipients different from those who need to be reached (i.e. current participants in multiple open instant messaging sessions of a user that has been interrupted). Accordingly, the recipient set in these existing systems is not responsive to the dynamically changing set of participants for the currently open instant messaging sessions of a given user. Moreover, access to broadcasting features of existing systems is often limited to users having special privileges (e.g. administrator users or the like), and they are not available to ordinary individual users of the instant messaging system. Moreover, existing systems fail to foresee any need to capture a list of participants from multiple instant messaging sessions to which a previous message has been sent (e.g. "sorry—I have to answer the phone. I'll be right back!"), so that a subsequent message can be sent to that same set of users at the end of the interruption (e.g. "OK—I'm back now.").

For the above reasons and others, it would be desirable to have a new system that allows an instant messaging system user to quickly and conveniently communicate with other participants in multiple current instant messaging sessions at the time of an interruption, and to capture the list of participants to which a previous message was sent so that a subsequent message can be sent to those same users when the interruption is over.

SUMMARY OF THE INVENTION

In order to address the above described and other shortcomings of previous techniques, a new method and system are disclosed for providing open session based selective broadcasting in an instant messaging system. In the disclosed system, the instant messaging system user is provided with a mechanism through which they can broadcast a user-defined message to the participants in all currently open instant messaging sessions with the user, or to the participants in a selected subset of currently open instant messaging sessions with the user. The disclosed system further provides the ability to capture and save a list of the participants receiving a previously broadcasted message. The captured participant list can be subsequently recalled and used to broadcast another user defined message when the interruption ends, and the user can resume participation in the sessions.

The selective broadcasting provided by the disclosed system is advantageous in that it allows a user to send an interruption notification message to an appropriate set of recipients in the context of simultaneous participation by the user in multiple instant messaging sessions. The recipient set is dynamically determined based on the current set of instant messaging sessions a user is participating in. The disclosed approach stands in contrast to that of previous systems that allowed broadcasting of messages by privileged users to all other users in a group or community, without determining the participants in multiple current open sessions of a broadcasting user.

Thus there is disclosed a new system that allows an instant messaging system user to quickly and conveniently communicate with other participants in multiple current instant messaging sessions at the time of an interruption, and to also capture the list of participants to which a previous message was sent so that a subsequent message can be sent to those same users when the interruption is over.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
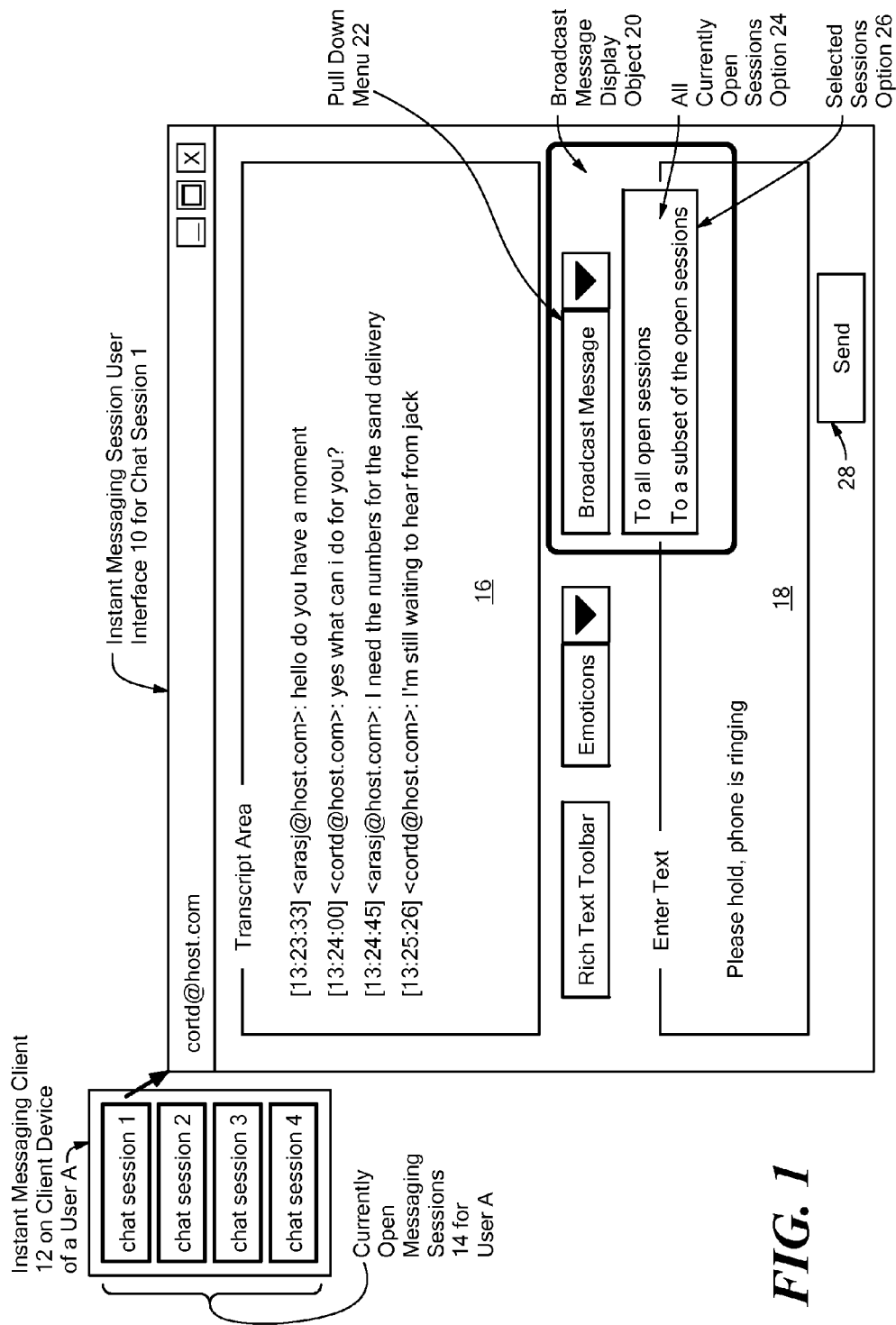
FIG. 1 is a block diagram showing a graphical user interface and client system for providing user access to a selective broadcast message in an illustrative embodiment.

FIG. 1 is a block diagram showing a graphical user interface and client system for providing user access to a selective broadcast message in an illustrative embodiment. As shown in FIG. 1, an Instant Messaging Session User Interface display object 10 is one of a plurality of instant messaging user interfaces for corresponding ones of the Currently Open Instant Messaging Sessions 14 of User A. The Currently Open Instant Messaging Sessions 14 are displayed in a graphical user interface of a client device associated with User A, by an Instant Messaging Client 12 contained in the client device of User A.

As shown in FIG. 1, the Instant Messaging Session User Interface 10 includes a Transcript Display Area 16, in which are displayed instant messages entered into the session by participants in the session (e.g. by participants "arasj@host.com" and "cortd@host.com"). In the example of FIG. 1, User A corresponds to the instant messaging session participant "arasj@host.com".

The Instant Messaging Session User Interface 10 further includes a Message Entry field 18 for User A to use for entering messages into the instant messaging session "chat session 1 " with the session participant "cortd@host.com". When User A clicks on the Send button 28, the contents of the Message Entry field 18 is entered into "chat session 1", and accordingly appears in the Transcript Display Area 16 for viewing by User A, and also in instant messaging session user interface transcript display areas displayed on client devices of other participants in "chat session 1" (i.e. "cortd@host.com").

The Instant Messaging Session User Interface 10 also includes an example of a Broadcast Message Command Display Object 20, through which User A can access selective open session broadcasting features of the disclosed system. In the embodiment of FIG. 1, the Broadcast Message Command Display Object 20 includes a Pull Down Menu 22 through which User A can access a number of selective open session broadcast options. The user selectable options shown in FIG. 1 include an All Currently Open Sessions Option 24 and a Selected Sessions Option 26. If User A selects (e.g. clicks on) the All Currently Open Sessions Option 24, the disclosed system operates to enter the contents of the Message Entry field 18 (e.g. "Please hold, phone is ringing") into all currently open instant messaging sessions in which User A is a participant (e.g. all participants in "chat session 1", "chat session 2", "chat session 3", and "chat session 4"). Moreover, while the contents of the Message Entry field 18 is shown for purposes of illustration in FIG. 1 as including text, the contents of Message Entry field 18 may alternatively be a link such as a URL (Uniform Resource Locator), or some other type of link or pointer. The instant message made of the contents of Message Entry field 18 is sent to all participants in all currently open instant messaging sessions in which User A is a participant at the time the All Currently Open Sessions Option 24 is selected by User A.

Alternatively, if User A selects (e.g. clicks on) the Selected Sessions Option 26, the disclosed system operates to provide a session selection user interface object through which User A can indicate which of the Currently Open Instant Messaging Sessions 14 are to be sent the contents of the Message Entry field 18. Such a session selection user interface object may, for example, consist of a list of currently open instant messaging sessions (e.g. "chat session 1", "chat session 2", "chat session 3", and "chat session 4"), with check boxes displayed adjacent to each list entry to enable User A to check (e.g. click on) the instant messaging sessions to which the contents of Message Entry field 18 is to be sent.

Figure 2:
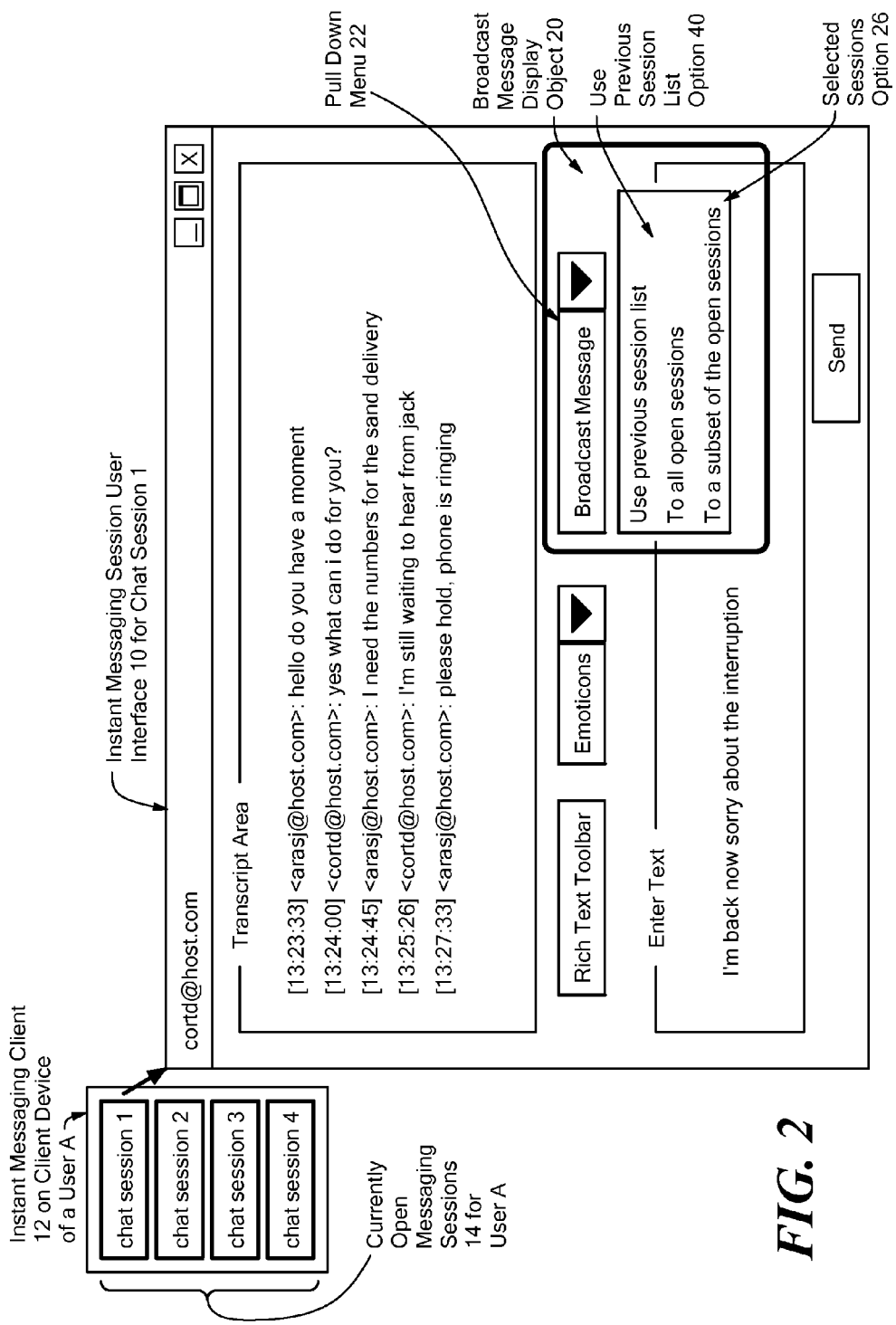
FIG. 2 is a block diagram showing a graphical user interface and client for providing user access to the recipient list of a prior selective broadcast message in an illustrative embodiment.

FIG. 2 is a block diagram showing a graphical user interface and client for providing user access to the recipient list of a prior selective broadcast message in an illustrative embodiment. As shown in FIG. 2, the Pull Down Menu 22 of FIG. 1 has an additional selective open session broadcast option consisting of the Use Previous Session List Option 40. The Use Previous Session List Option 40 is displayed following use of one of the other selective open session broadcast options by User A to transmit a previous message, so that a new contents of the Message Entry field 18 (e.g. "I'm back now sorry about the interruption") can be sent to the same sessions/recipients as the previous message. The User Previous Session List Option 40 reflects the fact that the disclosed system maintains a list of previous sessions and/or individual session participants to which a previous broadcast message was sent using any of the selective open session broadcast options (e.g. the All Currently Open Sessions Option 24 or the Selected Session Option 26) in the Pull Down Menu 22. This enables User A to provide a follow up message informing the previous message recipients that an interruption is over, and that User A can accordingly resume participation in the instant messaging sessions.

Figure 3:
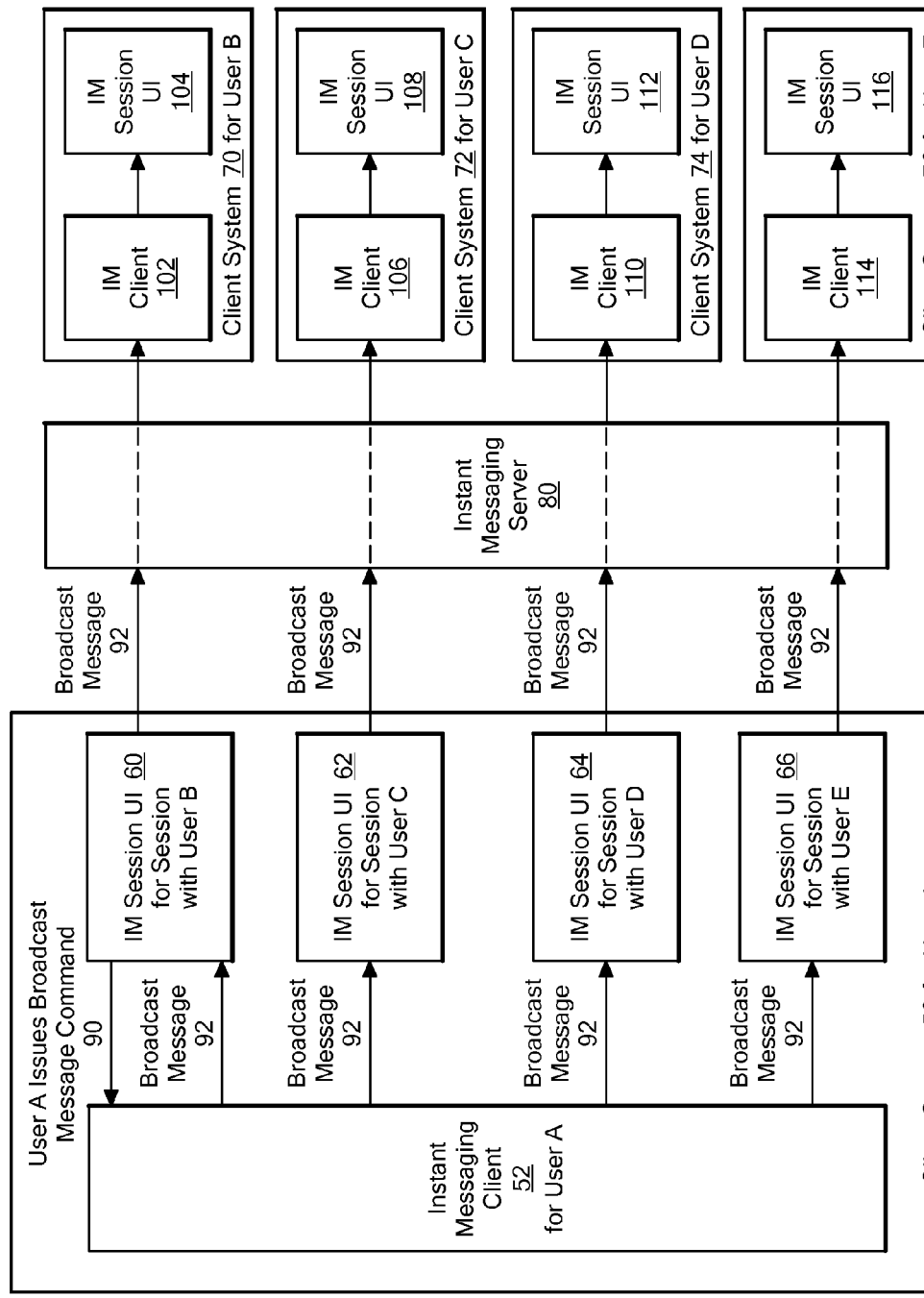
FIG. 3 is a block diagram showing operation of an illustrative embodiment of the disclosed system to broadcast a message to participants in all current instant messaging sessions of a user.

FIG. 3 is a block diagram showing operation of an illustrative embodiment of the disclosed system to broadcast a message to participants in all current instant messaging sessions of a user. As shown in FIG. 3, User A Issues Broadcast Command 90 in the Instant Messaging Session User Interface 60 (e.g. by clicking on the All Currently Open Sessions Option 24). The broadcast message command is passed to the Instant Messaging Client 52 for User A. In response to the received broadcast message command, the Instant Messaging Client 52 operates to enter a Broadcast Message 92 (e.g. the contents of Message Entry field 18, such as "Please hold, phone is ringing" or the like) into all the currently open instant messaging sessions in which User A is a participant (e.g. by loading Broadcast Message 92 into message entry fields of the user interfaces 60, 62, 64 and 66). In one embodiment of the disclosed system, the "Send" function in each currently open instant messaging session of User A is automatically invoked (e.g. in the user interfaces 60, 62, 64 and 66), causing the Broadcast Message 92 to be transmitted from Client System 50 for User A to an Instant Messaging Server system 80, from which the Broadcast Message 92 is then forwarded to the client systems (e.g. client systems 70, 72, 74 and 76) of the participants in all the currently open instant messaging sessions of User A. The Broadcast Message 92 is received by the instant messaging client in each client system (e.g. instant messaging clients 102, 106, 110 and 114), and displayed in the transcript display areas of the instant messaging session user interfaces for each respective instant messaging session participant (e.g. within the instant messaging session user interfaces 104, 108, 112 and 116).

Figure 4:
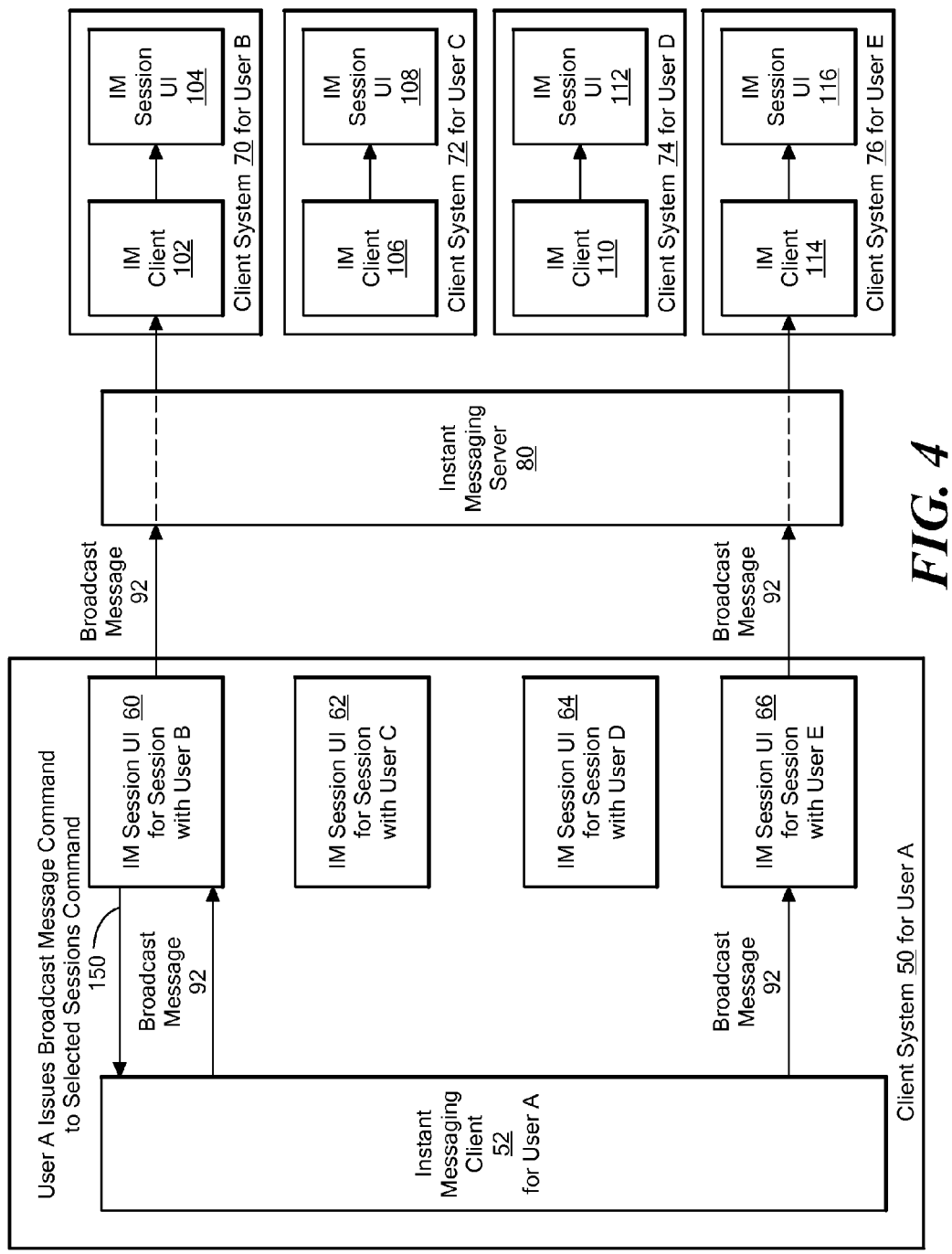
FIG. 4 is a block diagram showing operation of an illustrative embodiment of the disclosed system to broadcast a message to participants in a user-selected subset of the current instant messaging sessions of a user.

FIG. 4 is a block diagram showing operation of an illustrative embodiment of the disclosed system to broadcast a message to participants in a user-selected subset of the current instant messaging sessions of a user. As shown in FIG. 4, User A Issues Broadcast Command 150 in the Instant Messaging Session User Interface 60 (e.g. by clicking on the Selected Sessions Option 26). The broadcast message command is passed to the Instant Messaging Client 52 for User A. In response to the received broadcast message command, the Instant Messaging Client 52 operates to provide User A with a user interface object that allows User A to select which of the currently open sessions in which User A is a participant are to be sent the broadcast message (e.g. a pop-up window including a list of sessions with each session having a check box for user selection). After user selection of the relevant subset of currently open instant messaging sessions, the Instant Messaging Client 52 enters a Broadcast Message 92 (e.g. the contents of Message Entry field 18, such as "Please hold, phone is ringing" or the like) into the user selected subset of currently open instant messaging sessions in which User A is a participant. For example, in the case where User A has selected the current instant messaging session with User B and the current instant messaging session with User E from the currently open instant messaging sessions of User A, then the Instant Messaging Client 52 loads Broadcast Message 92 into message entry fields of the user interfaces 60 and 66. In one embodiment of the disclosed system, the "Send" function is automatically invoked in the relevant user interfaces (e.g. in the user interfaces 60 and 66), causing the Broadcast Message 92 to be transmitted from Client System 50 for User A to an Instant Messaging Server system 80, from which the Broadcast Message 92 is then forwarded to the client systems (e.g. client systems 70 and 76) of all participants in the user selected subset of open instant messaging sessions for User A. The Broadcast Message 92 is received by the instant messaging client in the client systems for the participants in the selected sessions (e.g. instant messaging clients 102 and 114), and displayed in the transcript display areas of the instant messaging session user interfaces for each respective instant messaging session participant in the selected sessions (e.g. within the instant messaging session user interfaces 104 and 116).

Figure 5:
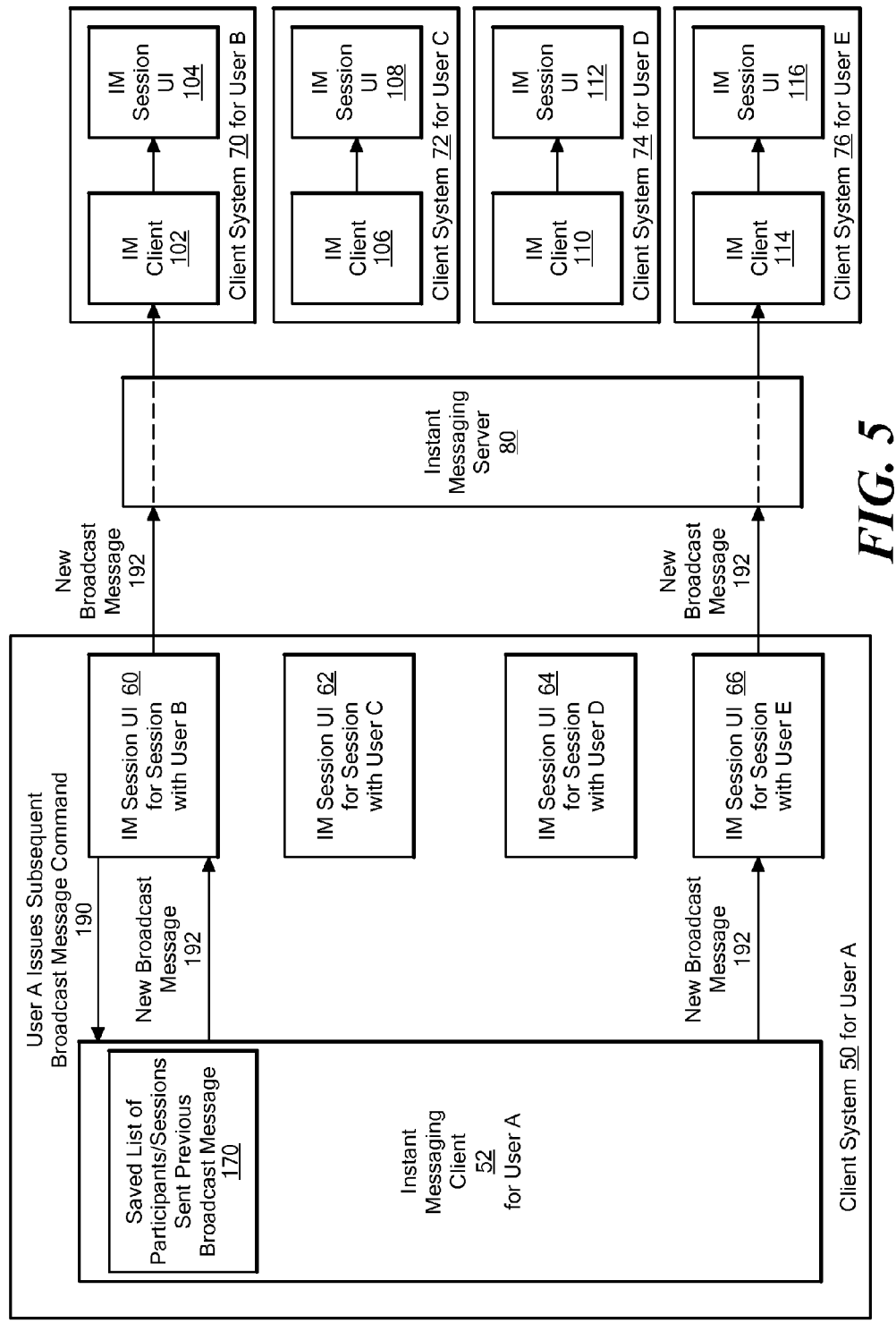
FIG. 5 is a block diagram showing operation of an illustrative embodiment of the disclosed system to broadcast a message to recipients of a previous broadcast message.

FIG. 5 is a block diagram showing operation of an illustrative embodiment of the disclosed system to broadcast a message to recipients of a previous broadcast message. As shown in FIG. 5, the Instant Messaging Client 52 maintains a list of the sessions and/or session participant to which a previous broadcast message was sent, shown as Saved List of Participants/Sessions Sent Previous Broadcast Message 170. The Saved List of Participants/Sessions Sent Previous Broadcast Message 170 may, for example, consist of a list of session identifiers for those sessions to which the previous broadcast message was sent, a list of participant identifiers (e.g. screen names) of participants to which the previous broadcast message was sent, and/or other specific indicators of relevant sessions and/or session participants.

As shown in FIG. 5, User A Issues Broadcast Command 190 in the Instant Messaging Session User Interface 60 (e.g. by clicking on the Use Previous Session List Option 40). The broadcast message command is passed to the Instant Messaging Client 52 for User A. In response to the received broadcast message command, the Instant Messaging Client 52 operates to access the Saved List of Participants/Sessions Sent Previous Broadcast Message 170 to determine the set of instant messaging sessions and/or session participants to which a New Broadcast Message 192 (e.g. the contents of Message Entry field 18, such as "I'm back now sorry about the interruption") is to be sent. For example, in the case where the previous broadcast command was the Broadcast Command 92 of FIG. 4, through which User A indicated that the instant messaging sessions with User B and User E were to be sent the previous broadcast message (e.g. "Please hold, phone is ringing"), then the Saved List of Participants/Sessions Sent Previous Broadcast Message 170 would include indications of the instant messaging sessions in which User B and User E were participants, and/or indications of User B and User E (e.g. screen names for User B and User E). Based on the contents of the Saved List of Participants/Sessions Sent Previous Broadcast Message 170, the Instant Messaging Client 52 would then operate to enter the Broadcast Message 192 into the instant messaging sessions indicated by the Saved List of Participants/Sessions Sent Previous Broadcast Message 170. For example, in the case where User A has selected the current instant messaging session with User B and the current instant messaging session with User E from the currently open instant messaging sessions of User A, then the Instant Messaging Client 52 loads Broadcast Message 92 into message entry fields of the user interfaces 60 and 66. In one embodiment of the disclosed system, the "Send" function is automatically invoked in the relevant user interfaces (e.g. in the user interfaces 60 and 66), causing the Broadcast Message 92 to be transmitted from Client System 50 for User A to an Instant Messaging Server system 80, from which the Broadcast Message 92 is then forwarded to the client systems (e.g. client systems 70 and 76) of all participants in the previously stored list of participants/sessions to which a previous broadcast message was sent. The Broadcast Message 92 is received by the instant messaging client in the client systems for the participants in the relevant sessions (e.g. instant messaging clients 102 and 114), and displayed in the transcript display areas of the instant messaging session user interfaces for each respective instant messaging session participant (e.g. within the instant messaging session user interfaces 104 and 116).

The client systems 50, 70, 72, 74 and 76 of FIGS. 3-5 may be any specific type of a computer system or intelligent electronic device, such as a desktop, laptop, or palmtop computer system, or a personal digital assistant, cell phone, or other electronic device. Each of the client systems 50, 70, 72, 74 and 76 include or control a display device capable of displaying graphical user interfaces (e.g. including user interfaces 60, 62, 64, and 66 for user A, and including user interfaces 104, 108, 112, and 116 for users B, C, D and E) to the local users the respective client systems, such as a liquid crystal display (LCD), cathode ray tube (CRT), interferometric modulator display (IMOD), light emitting diode (LED), or the like.

Those skilled in the art will recognize that the instant messaging clients of the illustrative embodiments (e.g. instant messaging client 12 of FIGS. 1 and 2 and instant messaging client 52 of FIGS. 3-5) may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware.

Those skilled in the art will also recognize that the client and server systems of the illustrative embodiments (e.g. client systems 12, 52, 70, 72, 74 and 76 and server system 80) may each include one or more processors, and program storage, such as memory, for storing program code executable on such processors, as well as input/output devices and/or interfaces. The client systems 12, 52, 72, 74 and 76 and the server system 80, are interconnected to a computer or data communication network (e.g. the Internet, a Local Area Network, etc.) through one or more of such input/output devices or interfaces, and through which may further be provided communication to a number of other client systems and/or other server systems.

Figure 6:
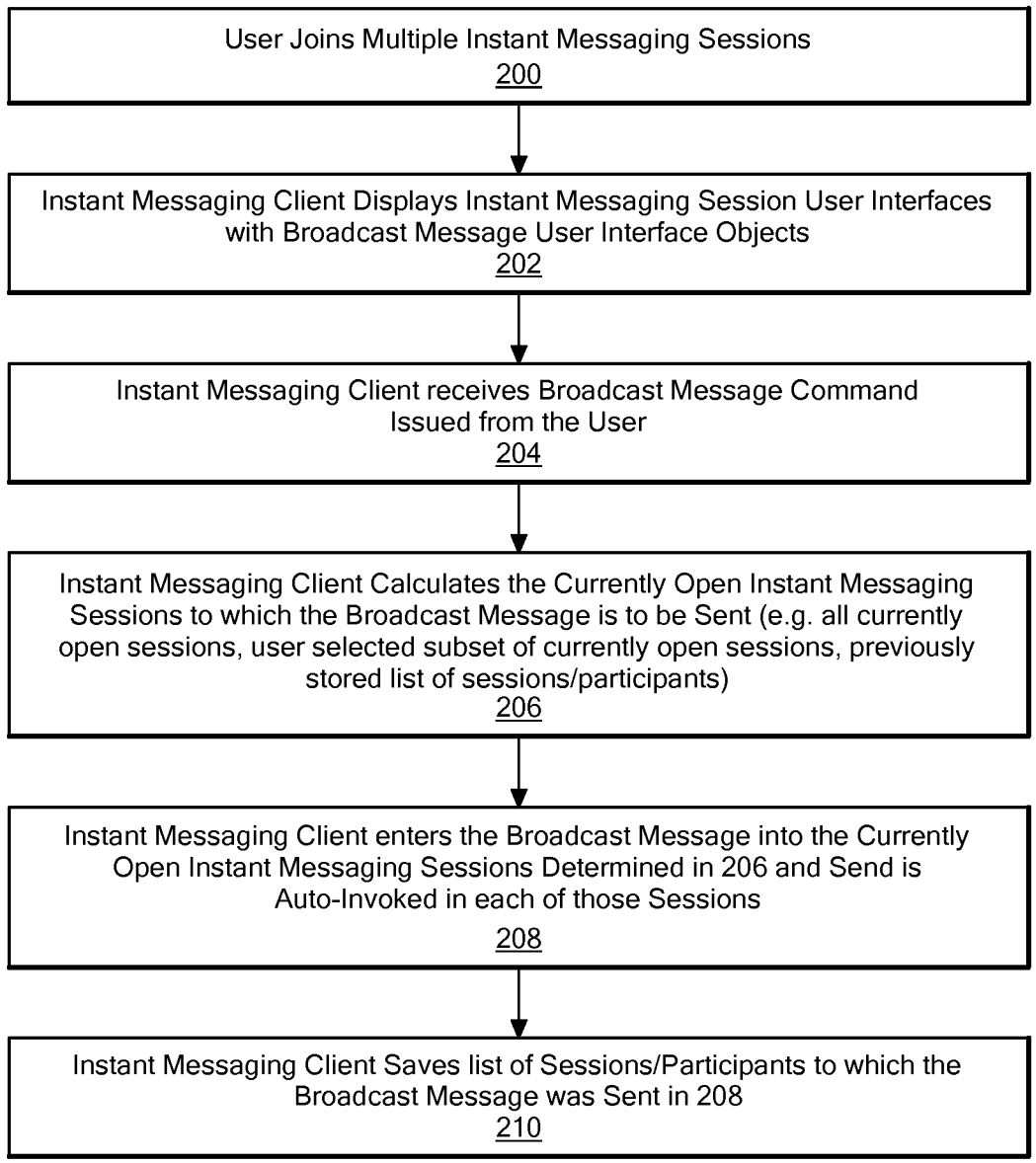
FIG. 6 is a flow chart showing steps performed during operation of an illustrative embodiment of the disclosed system.

FIG. 6 is a flow chart showing steps performed during operation of an illustrative embodiment of the disclosed system. As shown in FIG. 6, at step 200, the user of the disclosed system joins multiple instant messaging sessions, for example using an instant messaging client on a client device. At step 202, the instant messaging client displays an instant messaging session user interface for each of the currently opened instant messaging sessions of the user in a graphical user interface on a display device of the client system. Each instant messaging session user interface for each currently open instant messaging session includes a broadcast message user interface object (e.g. Broadcast Message Command Display Object 20), through which the user can issue selective open session broadcast commands.

At step 204, the disclosed system receives a broadcast message command issued by the user, for example through the broadcast message user interface object in one of the instant messaging session user interfaces for the user's currently open instant messaging sessions. At step 206, the disclosed system (e.g. the instant messaging client on the user's client device) calculates the currently open instant messaging sessions and/or participants to which the broadcast message is to be sent. The calculation of which sessions and/or participants to which the broadcast message is to be sent may be based on the type of broadcast command. For example, the broadcast command may indicate that the broadcast message is to be sent to all currently open instant messaging sessions of the user, to a user indicated subset of the currently open instant messaging sessions of the user, or to a set of sessions/participants indicated by a previously saved list of sessions/participants to which a previous broadcast message was sent.

At step 208, the disclosed system enters the message to be broadcast into the instant messaging sessions determined at step 206, and the Send function is automatically invoked in each of those sessions. At step 210, the instant messaging client of the disclosed system saves a list of participant/sessions to which the broadcast message was sent at step 208 for future reference.

While in the above description, the illustrative examples involve instant messaging sessions between a local user and one other participant, the present system is not so limited. Accordingly, the broadcast features of the present invention can be applied to instant messaging sessions in which a local user (e.g. User A), is one participant with multiple other participants.

Further, while in the above description certain functions and/or operations are described as being performed by a client portion of a client/server instant messaging system architecture, the present system is not so limited. Accordingly, alternative embodiments may be based on non-client/server models, and functions and/or operations described in the above examples as performed in a client portion of a client/server design may alternatively be performed in the server portion, and vice versa.

Moreover, while the above description regarding illustrative embodiments of the disclosed system includes examples of specific user interface display objects, which may be embodied as menus, graphical buttons, dialog boxes, and the like, and/or combinations thereof, the present invention is not limited to the specific examples above. Accordingly, those skilled in the art will recognize that alternative embodiments may use any specific type or kind of user interface display object that may be appropriate to accomplish the necessary operations.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method, comprising:

displaying, in an instant messaging user interface, a text editing window enabling a local user to compose an instant message and a first broadcast message command user interface object enabling said local user to send said instant message from said text editing window to multiple previously opened instant messaging sessions in which said local user is currently participating through respective currently open user interfaces;

detecting user selection of said first broadcast message command user interface object;

calculating, in response to said detecting user selection of said first broadcast message command user interface object, all previously opened instant messaging sessions in which said local user is currently participating; and sending said instant message to said previously opened instant messaging sessions in which said local user is currently participating by automatically entering said instant message into each of said currently open user interfaces of said multiple previously opened instant messaging sessions in which said local user is currently participating and automatically invoking a send function in each of said currently open user interfaces of said multiple previously opened instant messaging sessions in which said local user is currently participating.

2. The method of claim 1, wherein said instant message sent to said previously opened instant messaging sessions in which said local user is currently participating comprises a link.

3. The method of claim 1, further comprising:

displaying a second broadcast message command user interface object enabling said local user to send an instant message to participants in a subset of said previously opened instant messaging sessions in which said local user is currently participating;

detecting user selection of said second broadcast message command user interface object;

displaying, in response to said detecting user selection of said second broadcast message command user interface object, a session selection object enabling said local user to select said subset of said previously opened instant messaging sessions in which said local user is currently participating from all previously opened instant messaging sessions in which said local user is currently participating; and sending said instant message to all participants in said user selected subset of previously opened instant messaging sessions in which said local user is currently participating.

4. The method of claim 1, further comprising:

in response to said sending said instant message to all participants in said previously opened instant messaging sessions in which said local user is currently participating, storing a list of all participants in said previously opened instant messaging sessions to which said instant message was sent;

subsequently displaying a third broadcast message command user interface object enabling said local user to send a second instant message to all said participants in said previously opened instant messaging sessions to which said instant message was sent;

detecting user selection of said third broadcast message command user interface object; and sending, in response to said detecting user selection of said third broadcast message command, a second instant message to said participants stored in said list.

5. An apparatus, comprising:

at least one processor communicably coupled to a computer readable memory, said computer readable memory having stored thereon program code operable to cause a computer system to provide open session based selective broadcasting in an instant messaging system, said program code comprising:

program code for displaying, in an instant messaging user interface, a text window enabling a local user to compose an instant message and a first broadcast message command user interface object enabling said local user to send said instant message to multiple previously opened instant messaging sessions in which said local user is currently participating through respective currently open user interfaces;

program code for detecting user selection of said first broadcast message command user interface object;

program code for calculating, in response to said detecting user selection of said first broadcast message command user interface object, all previously opened instant messaging sessions in which said local user is currently participating; and program code for sending said instant message to said previously opened instant messaging sessions in which said local user is currently participating by automatically entering said instant message into each of said currently open user interfaces of said multiple previously opened instant messaging sessions in which said local user is currently participating and automatically invoking a send function in each of said currently open user interfaces of said multiple previously opened instant messaging sessions in which said local user is currently participating.

6. The apparatus of claim 5, wherein said instant message sent to said previously opened instant messaging sessions in which said local user is currently participating further comprises a link.

7. The apparatus of claim 5, said program code further comprising:

program code for displaying a second broadcast message command user interface object enabling said local user to send an instant message to a subset of said previously opened instant messaging sessions in which said local user is currently participating;

program code for detecting user selection of said second broadcast message command user interface object;

program code for displaying, in response to said detecting user selection of said second broadcast message command user interface object, a session selection object enabling said local user to select a subset of all previously opened instant messaging sessions in which said local user is currently participating from all previously opened instant messaging sessions in which said local user is currently participating; and program code for sending said instant message to all participants in said user selected subset of previously opened instant messaging sessions in which said local user is currently participating.

8. The apparatus of claim 5, said program code further comprising:

program code for, in response to said sending said instant message said previously opened instant messaging sessions in which said local user is currently participating, storing a list of all participants in said previously opened instant messaging sessions to which said instant message was sent;

program code for subsequently displaying a third broadcast message command user interface object enabling said local user to send a second instant message to all said participants in said previously opened instant messaging sessions to which said instant message was sent;

program code for detecting user selection of said third broadcast message command user interface object; and program code for sending, in response to said detecting user selection of said third broadcast message command, a second instant message to said participants stored in said list.

9. A computer program product comprising:
a non-transitory computer readable storage medium, said non-transitory computer readable storage medium having stored thereon program code operable to cause a computer system to provide open session based selective broadcasting in an instant messaging system, said program code comprising:
program code for displaying, in an instant messaging user interface, a text window enabling a local user to compose an instant message and a first broadcast message command user interface object enabling said local user to send said instant message from said text editing window to multiple previously opened instant messaging sessions in which said local user is currently participating through respective currently open user interfaces;
program code for detecting user selection of said first broadcast message command user interface object;
program code for calculating, in response to said detecting user selection of said first broadcast message command user interface object, all previously opened instant messaging sessions in which said local user is currently participating; and
program code for sending said instant message to said previously opened instant messaging sessions in which said local user is currently participating by automatically entering said instant message into each of said currently open user interfaces of said multiple previously opened instant messaging sessions in which said local user is currently participating and automatically invoking a send function in each of said currently open user interfaces of said multiple previously opened instant messaging sessions in which said local user is currently participating.

* * * * *